(12) United States Patent
Collins

(10) Patent No.: US 7,008,466 B2
(45) Date of Patent: Mar. 7, 2006

(54) METHOD FOR INHIBITING HYDRATE FORMATION

(75) Inventor: Ian Ralph Collins, Sunbury-on-Thames (GB)

(73) Assignee: BP Exploration Operating Company, London (GB)

( * ) Notice: Subject to any disclaimer, the term of this patent is extended or adjusted under 35 U.S.C. 154(b) by 114 days.

(21) Appl. No.: 10/487,596

(22) PCT Filed: Jul. 25, 2002

(86) PCT No.: PCT/GB02/03420

§ 371 (c)(1),
(2), (4) Date: Feb. 24, 2004

(87) PCT Pub. No.: WO03/021078

PCT Pub. Date: Mar. 13, 2003

(65) Prior Publication Data

US 2004/0211316 A1    Oct. 28, 2004

(30) Foreign Application Priority Data

Aug. 29, 2001  (GB) .................................. 0120912

(51) Int. Cl.
*B01D 53/14* (2006.01)
*C10L 3/00* (2006.01)

(52) U.S. Cl. ............................. 95/153; 95/154; 585/15; 585/950

(58) Field of Classification Search .................. 95/153, 95/154, 151, 188, 237, 253; 585/15, 833, 585/950
See application file for complete search history.

(56) References Cited

U.S. PATENT DOCUMENTS

| | | | |
|---|---|---|---|
| 4,776,966 A | | 10/1988 | Baker |
| 4,856,593 A | * | 8/1989 | Matthews et al. .......... 166/310 |
| 5,244,878 A | | 9/1993 | Sugier et al. |
| 5,639,925 A | * | 6/1997 | Sloan et al. ................... 585/15 |
| 5,877,361 A | * | 3/1999 | Rojey et al. ................... 585/15 |
| 5,880,319 A | | 3/1999 | Sloan, Jr. |
| 6,194,622 B1 | * | 2/2001 | Peiffer et al. .................. 585/15 |
| 6,581,687 B1 | * | 6/2003 | Collins et al. ............... 166/263 |
| 6,867,262 B1 | * | 3/2005 | Angel et al. ............. 525/326.9 |

FOREIGN PATENT DOCUMENTS

GB      2 002 400 A    2/1979

OTHER PUBLICATIONS

Notification of Transmittal of International Preliminary Examination Report for PCT/GB02/03420, International Filing date Jul. 25, 2002; 4 pages, mailed Mar. 18, 2004.

* cited by examiner

*Primary Examiner*—Frank M. Lawrence
(74) *Attorney, Agent, or Firm*—Nixon & Vanderhye

(57) ABSTRACT

A method for inhibiting the formation of gas hydrates within a fluid comprising a gaseous hydrocarbon phase, a liquid hydrocarbon phase and an aqueous phase which method comprises mixing a polymeric emulsifier and optionally a non-ionic non-polymeric co-emulsifier with the fluid prior to subjecting the fluid to conditions under which gas hydrates can be formed so as to generate a water-in-oil emulsion comprising a discontinuous aqueous phase, a continuous liquid hydrocarbon phase and a substantially gas impermeable interfacial layer comprising said polymeric emulsifier and optionally said non-ionic non-polymeric co-emulsifier wherein the aqueous phase is distributed in the continuous liquid hydrocarbon phase in the form of droplets and the substantially gas impermeable interfacial layer encapsulates said droplets.

27 Claims, No Drawings

METHOD FOR INHIBITING HYDRATE FORMATION

This application is the U.S. National Phase of International Application PCT/GB02/03420, filed Jul. 25, 2002, which designated the U.S.

FIELD OF INVENTION

The present invention relates to a method for inhibiting the formation of hydrates, in particular, to a method for inhibiting the formation of hydrates in the petroleum and natural gas industries.

BACKGROUND OF INVENTION

Hydrates are formed of two components, water and certain gas molecules, for example, alkanes having 1–4 carbon atoms, such as those found in natural gas or petroleum gas, for example, methane, ethane, propane, n-butane, isobutane, $H_2S$ and/or $CO_2$. These 'gas' hydrates will form under certain conditions, i.e. when the water is in the presence of the gas and when the conditions of high pressure and low temperature reach respective threshold values. The gas may be in the free state or dissolved in a liquid phase such as a liquid hydrocarbon.

The formation of such hydrates can cause problems in the oil and gas industries.

The problem is particularly of concern as natural gas and gas condensate resources are discovered where operating conditions surpass these threshold values, i.e. in deep cold water and on-shore in colder climates.

The problem, of hydrate formation may occur during gas transportation and processing, the solid hydrate precipitating from moist gas mixtures. This is particularly true with natural gas which when extracted from the well is normally saturated with water. Often in such a case, at cold temperatures (for example, temperatures of less than 10° C.), hydrates will form in downstream transportation networks and this can cause large pressure drops throughout the system and reduce or stop the flow of natural gas.

A typical situation where gas hydrate formation can occur is in off shore operations. When produced fluids comprising gas and water reach the surface of the seabed, the lowering of the temperature of the produced fluids (through heat exchange with the sea water which is typically at a temperature of 3 to 4° C. at the sea bed) generally results in the thermodynamic conditions for hydrates to form. Thus, as the fluids are transported either in a long vertical pipeline, for example, a riser system or through a pipeline laid along the seabed, solid gas hydrates may block the riser system or pipeline.

Several methods are known to prevent hydrate formation and subsequent problems in pipelines, valves and other processing equipment.

Physical methods have been used, e.g. insulation of pipelines in such a way as to avoid the transported produced fluids being cooled to below the threshold value for formation of hydrates under the operating pressure of the pipeline; drying the fluid before introduction into the pipeline; or lowering the pressure in the system. However, these techniques are either expensive or are undesirable because of loss of efficiency and production.

Chemical procedures have also been used. Electrolytes, for example, ammonia, aqueous sodium chloride, brines and aqueous sugar solutions may be added to the system.

Alternatively, the addition of methanol or other polar organic substances, for example, ethylene glycol or other glycols may be employed. Although methanol injection has been used widely to inhibit hydrate formation, it is only effective if a sufficiently high concentration (for example, 10 to 50% by weight of the water content) is present since at low concentrations there is the problem of facilitation of hydrate formation. Also, for methanol to be used economically under cold environmental conditions there must be early separation and expulsion of free water from the well in order to minimise methanol losses in the water phase.

According to U.S. Pat. No. 4,856,593, stoppage of gas production from gas wells may be prevented by incorporating in the gas a surface active agent which inhibits the formation of gas hydrates and/or the agglomeration of hydrate crystallites into large crystalline masses which are capable of blocking gas flow. The surface active agent may be introduced into a gas well through a workstring and co-mingles with natural gas flowing from the subterranean formation. Examples of surface active agents which may be employed include such materials as phosphonates, phosphate esters, phosphonic acids, esters of phosphonic acids, inorganic polyphosphates, salts and esters of inorganic polyphosphates, and polymers such as polyacrylamides and polyacrylates.

The use of certain amphiphilic compounds to lower the hydrate formation temperature and/or to modify the mechanism of formation of such hydrates is described in U.S. Pat. No. 4,915,176. The amphiphilic compounds may be non ionic, anionic or cationic. Examples of non ionic amphiphilic compounds include the oxyethylated fatty alcohols, the alcoxylated alkylphenols, the oxyethylated and/or oxypropylated derivatives, sugar ethers, polyol esters, such as glycerol, polyethylene glycol, sorbitol or sorbitan, sugar esters, niono and diethanolamides, carboxylic acid amides, sulfonic acids or amino acids. Suitable anionic amphiphilic compounds include carboxylates, such as metal soaps, alkaline soaps or organic soaps (such as N-acylaminoacids, N-acylsarcosinates, N-acylglutamates, N-acylpolypeptides); sulfonates such as alkylbenzenesulfonates or sulfosuccinic derivatives; sulfates such as alkylsulfates, alkylethersulfates, and phosphates. Among the cationic amphiphilic compounds are alkylamine salts, quaternary ammonium salts, such as alkyltrimethylammonium derivatives, alkyltriethylammonium derivatives, alkyldimethylbenzylammonium derivatives, alcoxylated alkylamine derivatives, heterocyclic derivatives, such as pyridinium, imidazolinium, quinolinium, piperidinium or morpholinium derivatives.

U.S. Pat. No. 4,973,775 describes the use of amphiphilic compounds, in particular, non-ionic amphiphilic compounds or amphiphilic compounds including an amide group to delay the formation and/or reduce the agglomeration tendency of hydrates in conditions where a hydrate may be formed. The amide compounds may be hydroxylated amide compounds, notably carbylamides of substituted or unsubstituted carboxylic acids, carbylamides of amino acids such as peptides, or sulfonic acid amides.

U.S. Pat. No. 5,877,361 describes a process which allows a hydrate-dispersing additive to be at least partly recovered and recycled. The method is said to be particularly advantageous when the amount of liquid hydrocarbon phase, oil or condensate is such that a water-in-oil emulsion may form. It is said to be possible to use the recovery technique during the production of condensate gas or of oil with associated gas since, in both cases, the presence of a liquid hydrocarbon phase is certain in the production pipe, from the wellhead to the separator or to the terminal. The hydrate-dispersing additive fed into the liquid hydrocarbon phase disperses the water and the hydrates after the formation thereof within the liquid hydrocarbon phase, thus ensuring their transportation in the dispersed form. Suitable dispersing additives are polyol and carboxylic acid esters or carboxylic acid hydroxycarbylamides.

DESCRIPTION OF THE INVENTION

We have now found that the formation of gas hydrates can be inhibited by mixing certain polymeric emulsifiers with a fluid comprising a gaseous hydrocarbon phase, a liquid hydrocarbon phase and water prior to the fluid being subjected to conditions under which gas hydrates can form.

Thus, according to a first embodiment of the present invention there is provided a method for inhibiting the formation of gas hydrates within a fluid comprising a gaseous hydrocarbon phase, a liquid hydrocarbon phase and an aqueous phase, which method comprises:

mixing a polymeric emulsifier and optionally a non-ionic non-polymeric co-emulsifier with the fluid prior to subjecting the fluid to conditions under which gas hydrates can be formed so as to generate a water-in-oil emulsion comprising a discontinuous aqueous phase, a continuous liquid hydrocarbon phase and a substantially gas impermeable interfacial layer comprising said polymeric emulsifier and optionally said non-ionic non-polymeric co-emulsifier wherein the aqueous phase is distributed in the continuous liquid hydrocarbon phase in the form of droplets and the substantially gas impermeable interfacial layer encapsulates said droplets.

Without wishing to be bound by any theory, it is believed that the substantially gas impermeable interfacial layer of the water-in-oil emulsion either physically separates the gaseous hydrocarbon phase from the aqueous phase thereby preventing gas hydrates from forming or substantially reduces the rate of diffusion of gas from the gaseous hydrocarbon phase into the aqueous phase thereby delaying the formation of gas hydrates when the fluid is subsequently subjected to conditions under which gas hydrates can form. Also, by encapsulating the aqueous phase in the substantially gas impermeable interfacial layer, any gas hydrate crystallites which may be formed (either from gas dissolved in the aqueous phase prior to formation of the water-in-oil emulsion or from gas which diffuses into the aqueous phase through the substantially gas impermeable interfacial layer of the water-in-oil emulsion) will be of a small particle size and will be dispersed in the external liquid hydrocarbon phase of the emulsion thereby mitigating the risk of agglomeration of the crystallites. The water-in-oil emulsion may be broken once conditions are no longer conducive to hydrate formation.

Preferably, the rate of diffusion of gas from the gaseous hydrocarbon phase through the interfacial layer into the internal aqueous phase of the water-in-oil emulsion is such that the formation of gas hydrates is delayed by at least 4 hours, preferably at least 12 hours, more preferably at least 24 hours.

Preferably, the gaseous hydrocarbon phase of the fluid comprises natural gas. Preferably, the liquid hydrocarbon phase of the fluid comprises a gas condensate (a hydrocarbon containing liquid associated with natural gas) or crude oil. Preferably, the aqueous phase comprises produced water i.e. water associated with natural gas or crude oil. The produced water may contain dissolved salts such as sodium chloride, calcium chloride, calcium carbonate, magnesium chloride and magnesium carbonate.

The polymeric emulsifier must have a hydrophilic/lipophilic balance (HLB) suited to the other liquids present in the emulsion, and an HLB value less than 8 is generally desirable for forming the water-in-oil emulsion. Suitably, the polymeric emulsifier may be a non-ionic block co-polymer, such as polyoxyethylene stearyl alcohols, polyoxyethylene cocoa amines, polyoxyethylene oleyl alcohols, polyoxyethylene stearyl alcohols, polyoxyethylene cetyl alcohols, fatty acid polyglycol esters, polyoxyethylene oleates, polyoxyethylene stearates, and fatty acid polyamine condensates. The water-in-oil emulsion may contain more than one polymeric emulsifier. Preferred polymeric emulsifiers are those sold under the trademark "Hypermer" produced by Imperial Chemical Industries (for example, Hypermer LP6 and Hypermer B246). These polymeric emulsifiers are described in U.S. Pat. No. 4,504,276, U.S. Pat. No. 4,509,950 and U.S. Pat. No. 4,776,966 (which are herein incorporated by reference).

The polymeric emulsifiers sold under the trademark "Hypermer" are described as a block or graft co-polymers of the general formula $(A\text{-}COO)_m B$, where m in an integer of at least 2 and, A is a polymeric component having a molecular weight of at least 500 and is the residue of an oil-soluble complex mono-carboxylic acid of the general structural formula:

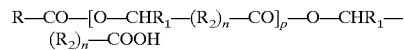

$$R\text{---}CO\text{---}[O\text{---}CHR_1\text{---}(R_2)_n\text{---}CO]_p\text{---}O\text{---}CHR_1\text{---}(R_2)_n\text{---}COOH$$

in which R is hydrogen or a monovalent hydrocarbon or substituted hydrocarbon group, $R_1$ is hydrogen or a monovalent $C_1$ to $C_{24}$ hydrocarbon group, R2 is a divalent $C_1$ to $C_{24}$ hydrocarbon group, n is zero or 1 and p is zero or an integer of up to 200; and (b) B is a polymeric component having a molecular weight of at least 500 and, in the case where m is 2, is the divalent residue of a water-soluble polyalkylene glycol of the general formula:

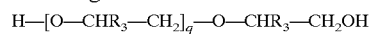

$$H\text{---}[O\text{---}CHR_3\text{---}CH_2]_q\text{---}O\text{---}CHR_3\text{---}CH_2OH$$

in which $R_3$ is hydrogen or a $C_1$ to $C_3$ alkyl group, q is an integer from 10 to 500, or, in the case where m is greater than 2, is the residue of valency m of a water-soluble polyether polyol of the general formula:

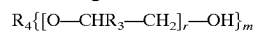

$$R_4\{[O\text{---}CHR_3\text{---}CH_2]_r\text{---}OH\}_m$$

in which $R_3$ and m have their previous significance, r is zero or an integer from 1 to 500, provided that the total number of:

$$\text{---}O\text{---}CHR_3\text{---}CH_2\text{---}$$

units in the molecule is at least 10, and $R_4$ is the residue of an organic compound containing in the molecule m hydrogen atoms reactive with an alkylene oxide.

Additional "Hypermer" polymeric emulsifiers include the reaction product of a polyalk(en)yl succinic anhydride with a polar compound containing in the molecule at least one hydroxyl or amino group. The preferred polyalk(en)yl succinic anhydride is a poly (isobutenyl) succinic anhydride having a molecular weight in the range of 400 to 5000. The preferred polar compound with which the anhydride is reacted may be a polyol such as ethylene glycol, propylene glycol, glycerol, trimethylol propane, pentaerythritol or sorbital; or with a polyamine, for example ethylene diamine, trimethylene diamine, hexamethylene diamine, dimethylaminopropylamine or diethylaminopropylamine or with a hydroxyamine for example monoethanolamine, diethanolamine, dipropanolamine, tris(hydroxymethyl)aminomethane or dimethylaminoethanol.

Suitably, the polymeric emulsifier which is mixed with the fluid may be a liquid. Alternatively, the polymeric emulsifier may be dissolved in a suitable hydrocarbon liquid (for example, toluene) and the resulting solution of polymeric emulsifier is mixed with the fluid. Preferably, the amount of polymeric emulsifier in the solution is in the range 5 to 50 wt %.

The non-ionic non-polymeric co-emulsifier (hereinafter "co-emulsifier") must have a hydrophilic/lipophilic balance (HLB) suited to the other liquids present in the emulsion. As discussed above, an HLB value less than 8 is generally desirable for forming the water-in-oil emulsion. Preferably, the co-emulsifier is selected from sorbitan monooleate, sorbitan monostearate, sorbitan trioleate, sorbitan tristearate, sorbitan monopalmitate, glyceryl stearate, glyceryl oleate, propylene glycol stearate, and diethylene glycol stearate. A preferred co-emulsifier is sorbitan trioleate (for example, SPAN 85™). More than one co-emulsifier may be employed. Without wishing to be bound by any theory, it is believed that the co-emulsifier decreases the permeability of the interfacial layer of the water-in-oil emulsion to the gas.

Preferably, the polymeric emulsifier and optional co-emulsifier are mixed with the fluid under conditions of high shear so as to ensure that substantially all of the water present in the fluid is dispersed in the form of droplets in the continuous liquid hydrocarbon phase of the water-in-oil emulsion.

The polymeric emulsifier and optional co-emulsifier may mixed with the fluid using a high shear mixing means. Suitably, the polymeric emulsifier and optional co-emulsifier are introduced into the fluid upstream of the high shear mixing means, preferably, immediately upstream of the high shear mixing means.

Preferred high shear mixing means include venturi nozzles, ultrasonic devices, chokes, acoustic whistles, high shear three phase pumps (for example, booster pumps) rotating discs, and stirrer paddles or propellers having high shear blades.

The polymeric emulsifier and optional co-emulsifier may be mixed with the fluid at a temperature of at least 10° C., preferably at least 20° C., for example, at least 30° C.

Where the fluid to be treated is a produced fluid from a gas field, i.e. comprises natural gas, a gas condensate and water, or from an oil field i.e. comprises natural gas, crude oil and water (hereinafter "produced fluid"), it is preferred to introduce the polymeric emulsifier and optional co-emulsifier at, or upstream of, the well head. Suitably, the high shear mixing means may be a "choke" i.e. a valve having a variable diameter orifice which provides a restriction in a flow line leading to the well manifold. However, any of the high shear mixing means described above may be provided in the flow line.

Typically, the temperature of the produced fluid at the well head is substantially above the threshold temperature for the formation of hydrates (10° C.). For example, the temperature of the produced fluid at the well head may be in the range 30 to 150° C.

Preferably, the weight ratio of emulsifier (i.e. polymeric emulsifier and optional co-emulsifier) to water in the water-in-oil emulsion generated in the process of the present invention is in the range 0.04:1 to 0.2:1.

Preferably, where the substantially gas impermeable interfacial layer of the water-in-oil emulsion generated in the process of the present invention comprises a polymeric emulsifier and a co-emulsifier, the polymeric emulsifier comprises the major portion of the emulsifier. Preferably, the mole ratio of polymeric emulsifier to optional co-emulsifier in the water-in-oil emulsion is at least 2:1, more preferably, at least 3:1, most preferably, at least 4:1, for example, at least 5:1.

Preferably, the water-in-oil emulsion generated in the process of the present invention has droplets of aqueous phase having a diameter of less than 10 $\mu$m, preferably less than 5 $\mu$m. Suitably, the mean diameter of the droplets of aqueous phase is the range of 0.5 to 2 $\mu$m.

Preferably, the droplets of aqueous phase have a polydispersity of up to 20%.

In a second embodiment of the present invention there is provided a method for transporting a produced fluid comprising a gaseous hydrocarbon phase, a liquid hydrocarbon phase and an aqueous phase, which method comprises the steps of:

(a) mixing a polymeric emulsifier and optionally a non-ionic non-polymeric co-emulsifier with the produced fluid prior to subjecting the produced fluid to conditions under which gas hydrates can be formed so as to generate a water-in-oil emulsion comprising a discontinuous aqueous phase, a continuous liquid hydrocarbon phase and a substantially gas impermeable interfacial layer comprising said polymeric emulsifier and said optional non-ionic non-polymeric co-emulsifier wherein the aqueous phase is distributed in the continuous liquid hydrocarbon phase in the form of droplets and the substantially gas impermeable interfacial layer encapsulates said droplets; and (b) transporting the emulsion generated in step (a) together with the gaseous hydrocarbon phase.

Typically, the emulsion and gaseous hydrocarbon phase (hereinafter "transported fluid") is transported through a riser or a pipeline, for example, a pipeline on the seabed. Preferably, the residence time of the transported fluid in the pipeline or riser is greater than 5 hours. Where the transported fluid is transported through a pipeline, the residence time of the transported fluid in the pipeline is, for example, up to 1 day.

An advantage of this second embodiment of the present invention is that the fluid may to be transported to a location where the conditions are no longer conducive to gas hydrate formation before any significant gas hydrate formation can occur. Also, any gas hydrates forming in the droplets of aqueous phase during transportation of the transported fluid will remain in dispersed form i.e. would not agglomerate and lead to problems in pipelines or valves or other processing equipment. A further advantage of this second embodiment of the present invention, is that gas hydrate inhibition allows for planned or emergency shut-ins of risers or pipelines.

The temperature of the transported fluid in the riser or pipeline may be less than 10° C., preferably less than 7° C., for example 4 to 5° C. Suitably, the transported fluid will be at a pressure of 10 to 100 bar, for example 20 to 30 bar.

Preferably, after completion of transportation of the transported fluid, the gaseous hydrocarbon phase is separated from the water-in-oil emulsion and the water-in-oil emulsion is broken so as to obtain an aqueous phase and a liquid hydrocarbon phase. The separation of the gaseous hydrocarbon phase is carried out under conditions which are not conducive to hydrate formation. Various well known methods can be implemented to break the emulsion. For example, the emulsion may be broken by increasing its temperature, by the addition of a demulsifier or by passing the emulsion to an electrostatic coalescer or a filter coalescer. Where the-emulsion is broken by increasing its temperature, the emulsion is preferably heated to a temperature of at least 50° C., preferably at least 70° C.

The gaseous hydrocarbon phase may be separated from the water-in-oil emulsion either prior to breaking the emulsion or during breaking of the emulsion.

Preferably, after completion of transportation, the transported fluid is passed to a separator. The temperature at which the separator is operated may be selected so as to break the water-in-oil emulsion in which case the transported fluid separates into its different phases (a gaseous hydrocarbon phase, a liquid hydrocarbon phase containing the polymeric emulsifier and the optional co-emulsifier and an aqueous phase). Alternatively, the temperature may be selected so as to avoid breaking the emulsion in which case a water-in-oil emulsion decants progressively to the bottom of the separator to form a lower emulsion phase and an upper supernatant hydrocarbon liquid phase. The polymeric emulsifier and the optional co-emulsifier are preferably in the lower emulsion phase. A gaseous hydrocarbon phase is discharged at or near the top of the separator while the emulsion phase which is in the lower part of the separator is discharged from the separator and is broken using any of the known techniques (for example, is heated in a heat exchanger) and is then fed to a further separator that separates the broken emulsion into an aqueous phase and a liquid hydrocarbon phase containing the polymeric emulsifier and the optional co-emulsifier. The polymeric emulsifier and the optional co-emulsifier may then be recovered from this liquid hydrocarbon phase for recycle to the mixing step. Alternatively, the liquid hydrocarbon phase may be at, least in part, recycled to the mixing step without separation of the polymeric emulsifier and the optional co-emulsifier. Make up polymeric emulsifier and make-up optional co-emulsifier may be introduced with the recycled polymeric emulsifier and optional co-emulsifier.

In yet a further embodiment of the present invention there is provided a fluid cornprising:
a) a gaseous hydrocarbon phase, and
b) an emulsion comprising a discontinuous aqueous phase, a continuous liquid hydrocarbon phase and a substantially gas impermeable interfacial layer comprising a polymeric emulsifier and optionally a non-ionic non-polymeric co-emulsifier wherein the aqueous phase is distributed in the continuous liquid hydrocarbon phase in the form of droplets and the substantially gas impermeable interfacial layer encapsulates said droplets.

Preferred features of the emulsion are as described above in relation to the first and second embodiments of the present invention.

The present invention will now be illustrated by reference to the following examples.

EXAMPLES

Emulsion Formation

Emulsions were prepared in batch sizes of 50 to 200 mls by adding an aqueous phase comprising a 1% by weight sodium chloride solution in deionised water to a liquid hydrocarbon phase comprising a solution of an emulsifier in a gas field condensate (liquid hydrocarbon phase) from the INDE field in the North Sea. Emulsification was achieved using a Janne and Kunkel Ultraturrax™ T25 high shear laboratory blender operating for approximately 20 seconds under medium shear conditions (13,500 rpm), a value chosen to simulate average pressure drop across a choke. Both the aqueous and liquid hydrocarbon phases were heated to a temperature of 65° C. prior to emulsification to simulate downhole conditions. The emulsions were then stored at a temperature of 5° C. for periods of up to 48 hours to simulate seabed storage/transport conditions. Water cuts of 10, 20 or 30% were used to form the emulsions where the water cut represents the percentage by volume of water in the mixture of the aqueous and hydrocarbon phases. Emulsifier concentrations were in the range 0.5–2.0% by weight based on the liquid hydrocarbon phase. The emulsifiers employed to form the emulsions are given in Table 1 below.

TABLE 1

| Emulsifier | Description | HLB value |
|---|---|---|
| Hypermer B246 ™ | Polyhydroxystearic acid-polyethyleneglycol-polyhydroxystearic acid | Approx 4.6 |
| Atlox 4914 ™ | Polyisobutene succinic anhydride-polyethyleneglycol | Approx 6 |
| Hypermer E 476 ™ | Polymeric emulsifier- | 6–7 |
| Span 85 ™ | Sorbitan Trioleate | 1.8 |
| Tegopren 7008 ™ | Polyalkylene silicone polyether | — |

Particle Sizing

The mean droplet diameter of the internal aqueous phase of the emulsions was determined using a MicroTrac™ SRA 9200 laser particle sizer. A small volume of the emulsion was diluted into filtered kerosene (filtered using a filter having a 0.45 μm pore size) for particle sizing. The data for different concentrations of emulsifier are shown in Table 2 below.

TABLE 2

| | Median Droplet Size in 30% water-in-oil emulsion (μm) | | |
|---|---|---|---|
| Emulsifier | 2% Emulsifier | 1% Emulsifier | 0.2% Emulsifier |
| Hypermer B246 | — | 1.0 | 6.4 |
| Atlox 4914 | — | 4.4 | 6.4 |
| Hypermer E476 | — | 7.4 | 9.4 |
| Span 85 | 7.7 | — | — |

Hydrate Testing

The propensity for hydrate formation was tested in an autoclave cell using the operating procedure given below. The autoclave cell was cleaned thoroughly before each test and a blank run carried out using 200 mls of deionised water at a stirring rate of 500 rpm. The autoclave cell was pressurized with gas from having the composition given in Table 3 below (obtained from Bacton Terminal which receives gas from the southern North Sea gas fields) to an initial pressure of 60–63 bar at a cell temperature of 4.0–4.3° C. If the period of time to hydrate formation was not within the expected range of 4–10 minutes the cell was cleaned again and the blank test repeated. Further blank runs were carried out using 10–30 mls of 1% by weight aqueous sodium chloride solution and 90–10 mls of INDE condensate, in the absence of emulsifier, under identical conditions.

Emulsions for testing were prepared as described above and each emulsion was stored for at least 12 hours at a temperature of 5° C. prior to loading into the cell. As for the blank run, gas from the Bacton Terminal was used to pressurise the autoclave cell to an initial pressure of 60–63 bar at a temperature of 4.0–4.3° C. In general, experiments were run until there was evidence of failure. This was normally apparent as a strong exotherm leading to a temperature spike with a concomitant sharp decrease in pressure (typically of approx 15 bar).

TABLE 3

Gas Composition

| Component | Bacton Terminal Gas % volume |
|---|---|
| Nitrogen | 3.61 |
| Carbon Dioxide | 0.72 |
| Ethane | 3.12 |
| Propane | 0.62 |
| Iso-Butane | 0.10 |
| n-Butane | 0.13 |
| Iso-Pentane | 0.05 |
| n-Pentane | 0.04 |
| n-Hexane | 0.18 |
| Methane | Balance |

Operating Procedure for Hydrate Testing using Stirred Autoclave

A autoclave cell comprising a cylindrical part, a top plate (having a gas inlet fitting, a gas outlet fitting, a thermocouple fitting, a pressure transducer fitting, and an inset sapphire window) and a bottom plate was assembled as follows. The bottom plate was connected to the cylindrical part of the autoclave cell. A magnetic stirrer bar was then placed in the autoclave cell and the required volume of test fluid added. The test fluid was double distilled water (blank run) or 10–30 ml of a 1% by weight NaCl solution in water and 90–10 ml of INDE condensate (further blank runs) or an emulsion prepared as described above (runs according to the present invention). The top plate was then lowered into place. A thermocouple and a pressure transducer were inserted into their respective fittings in the upper plate and the fittings tightened. The gas inlet and outlet supply lines were then connected to the gas inlet and outlet fittings respectively via swagelock quick release couplings. A small amount of distilled water was then squirted onto the outside of the sapphire window. A boroscope was lowered into position above the top plate of the autoclave cell so that it could be focused through the sapphire window and was attached to a camera. The stirrer was switched on and set to a stirring rate of 500 rpm. The test fluid in the autoclave cell was cooled to a test temperature of 4° C. by means of a Julabo™ cooling unit. Once the test temperature was attained, the stirrer was switched off. The autoclave cell was then pressurised to 63 bar using Bacton Terminal gas, checking constantly for leaks at all joints and fittings. The stirrer was then re-started at a stirring rate of 500 rpm with the cooling unit set to the test temperature of 4° C. Data logging of the cell temperature and pressure together with continuous video recording of the interior of the cell via the boroscope and camera was initiated upon re-starting the stirring. Hydrate formation was assessed by visual examination of the cell contents, by any increase in the measured torque on the stirrer bar and by gas consumption in the cell manifested as a pressure drop in the cell.

| Test System | Time to Hydrate formation in minutes |
|---|---|
| Double Distilled Water (blank run) | 9 |
| 30% aqueous phase (1% NaCl solution) + 70% INDE Condensate (blank run) | 21 |
| 10% aqueous phase (1% NaCl solution) + 90% INDE Condensate emulsified with 1% ATLOX 4914 (Polyisobutenesuccinic anhydride – polyethylene glycol copolymer) | 215 |
| 20% aqueous phase (1% NaCl solution) + 80% INDE Condensate emulsified with 1% ATLOX 4914 | 112 |
| 30% aqueous phase (1% NaCl solution) + 70% INDE Condensate emulsified with 1% ATLOX 4914 | 161 |
| 10% aqueous phase (1% NaCl solution) + 90% INDE Condensate emulsified with 2% Hypermer B246 (polyhydroxystrearic acid) | 860 |
| 20% aqueous phase (1% NaCl solution) + 80% INDE Condensate emulsified with 2% Hypermer B246 | 533 |
| 30% aqueous phase (1% NaCl solution) + 70% INDE Condensate emulsified with 2% Hypermer B246 | 590 |
| 30% aqueous phase (1% NaCl solution) + 70% INDE Condensate emulsified with 1% Hypermer B246 | 182 |
| 30% aqueous phase (1% NaCl solution) + 70% INDE Condensate emulsified with 1.5% Hypermer B246 + 0.225% sorbitan trioleate | 251 |
| 30% aqueous phase (1% NaCl solution) + 70% INDE Condensate emulsified with 1.5% Hypermer B246 + 0.45% sorbitan trioleate | 803 |

The results show that the time to hydrate formation is substantially increased when the aqueous phase is encapsulated in the liquid hydrocarbon phase of a water-in-oil emulsion.

The invention claimed is:

1. A method for inhibiting the formation of gas hydrates within a fluid comprising a gaseous hydrocarbon phase, a liquid hydrocarbon phase and an aqueous phase, which method comprises:

mixing a polymeric emulsifier and optionally a non-ionic non-polymeric co-emulsifier with the fluid prior to subjecting the fluid to conditions under which gas hydrates can be formed so as to generate a water-in-oil emulsion comprising a discontinuous aqueous phase, a continuous liquid hydrocarbon phase and a substantially gas impermeable interfacial layer comprising said polymeric emulsifier and optionally said non-ionic non-polymeric co-emulsifier wherein the aqueous phase is distributed in the continuous liquid hydrocarbon phase in the form of droplets and the substantially gas impermeable interfacial layer encapsulates said droplets.

2. A method for transporting a fluid comprising a gaseous hydrocarbon phase, a liquid hydrocarbon phase and an aqueous phase, which method comprises the steps of:

(a) mixing a polymeric emulsifier and optionally a non-ionic non-polymeric co-emulsifier with the fluid prior to subjecting the fluid to conditions under which gas hydrates can be formed so as to generate a water-in-oil emulsion comprising a discontinuous aqueous phase, a continuous liquid hydrocarbon phase and a substantially gas impermeable interfacial layer comprising said polymeric emulsifier and optionally said non-ionic non-polymeric co-emulsifier wherein the aqueous phase is distributed in the continuous liquid hydrocarbon phase in the form of droplets and the substantially gas impermeable interfacial layer encapsulates said droplets; and (b) transporting the emulsion generated in step (a) together with the gaseous hydrocarbon phase.

3. A method as claimed in claim 1 wherein the fluid is a produced fluid from an oil well or gas well.

4. A method as claimed in claim 2 wherein the water-in-oil emulsion and the gaseous hydrocarbon phase are transported through a riser or a pipeline.

5. A method as claimed in claim 4 wherein the residence time of the water-in-oil emulsion and the gaseous hydrocarbon phase in the riser or pipeline is greater than 5 hours.

6. A method as claimed in claim 1 wherein the polymeric emulsifier and the optional non-ionic non-polymeric emulsifier are mixed with the fluid at a temperature of at least 20° C., preferably at least 30° C. and the water-in-oil emulsion and the gaseous hydrocarbon phase are subsequently cooled to temperature of less than 10° C., preferably less than 7° C.

7. A method as claimed in claim 2 wherein the water-in-oil emulsion is transported together with the gaseous hydrocarbon phase at a pressure of from 10 to 100 bar.

8. A method as claimed in claim 2 wherein after completion of transportation of the water-in-oil emulsion and the gaseous hydrocarbon phase, the gaseous hydrocarbon phase is separated from the water-in-oil emulsion and the water-in-oil emulsion is broken so as to obtain an aqueous phase and a liquid hydrocarbon phase wherein the liquid hydrocarbon phase contains the polymeric emulsifier and the optional non-ionic non-polymeric co-emulsifier.

9. A method as claimed in claim 8 wherein the polymeric emulsifier and the optional non-ionic non-polymeric co-emulsifier are recovered from the liquid hydrocarbon phase and are recycled to the mixing step (a).

10. A method as claimed in claim 1 wherein the gaseous hydrocarbon phase comprises natural gas, the liquid hydrocarbon phase comprises a gas condensate or crude oil and the aqueous phase comprises produced water.

11. A method as claimed in claim 10 wherein the produced water contains dissolved salts selected from the group consisting of sodium chloride, calcium chloride, calcium carbonate, magnesium chloride and magnesium carbonate.

12. A method as claimed in claim 1 wherein the polymeric emulsifier and the optional co-emulsifier each have an HLB value of less than 8.

13. A method as claimed in claim 12 wherein the polymeric emulsifier is a non-ionic block co-polymer.

14. A method as claimed in claim 13 wherein the non-ionic block co-polymer is selected from the group consisting of polyoxyethylene stearyl alcohols, polyoxyethylene cocoa amines, polyoxyethylene oleyl alcohols, polyoxyethylene stearyl alcohols, polyoxyethylene cetyl alcohols, fatty acid polyglycol esters, polyoxyethylene oleates, polyoxyethylene stearates, and fatty acid polyamine condensates.

15. A method as claimed in claim 14 wherein the non-ionic block copolymer is of the general formula $(A\text{-}COO)_m B$, where m in an integer of at least 2, A is a polymeric component having a molecular weight of at least 500 and is the residue of an oil-soluble complex monocarboxylic acid of the general structural formula:

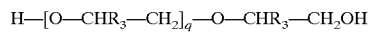

in which R is hydrogen or a monovalent hydrocarbon or substituted hydrocarbon group, $R_1$ is hydrogen or a monovalent $C_1$ to $C_{24}$ hydrocarbon group, $R_2$ is a divalent $C_1$ to $C_{24}$ hydrocarbon group, n is zero or 1 and p is zero or an integer of up to 200; and B is a polymeric component having a molecular weight of at least 500 and, in the case where m is 2, is the divalent residue of a water-soluble polyalkylene glycol of the general formula:

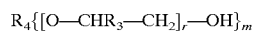

in which $R_3$ is hydrogen or a $C_1$ to $C_3$ alkyl group, q is an integer from 10 to 500, or, in the case where m is greater than 2, is the residue of valency m of a water-soluble polyether polyol of the general formula:

in which $R_3$ and m have their previous significance, r is zero or an integer from 1 to 500, provided that the total number of:

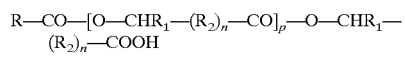

units in the molecule is at least 10, and $R_4$ is the residue of an organic compound containing in the molecule m hydrogen atoms reactive with an alkylene oxide.

16. A method as claimed in claim 14 wherein the non-ionic block copolymer is the reaction product of a polyalk (en)yl succinic anhydride with a polar compound having at least one hydroxyl or amino group.

17. A method as claimed in claim 16 wherein the polyalk (en)yl succinic anhydride is a poly (isobutenyl) succinic anhydride having a molecular weight in the range of 400 to 5000 and the polar compound is (a) a polyol selected from the group consisting of ethylene glycol, propylene glycol, glycerol, trimethylol propane, pentaerythritol and sorbital; (b) a polyamine selected from the group consisting of ethylene diamine, trimethylene diamine, hexamethylene diamine, dimethylaminopropylamine and diethylaminopropylamine; or (c) a hydroxyamine selected from the group consisting of monoethanolamine, diethanolamine, dipropanolamine, tris(hydroxymethyl)aminomethane and dimethylaminoethanol.

18. A method as claimed in claim 1 wherein the optional co-emulsifier is selected from the group consisting of sorbitan monooleate, sorbitan monostearate, sorbitan trioleate, sorbitan tristearate, sorbitan monopalmitate, glyceryl stearate, glyceryl oleate, propylene glycol stearate, and diethylene glycol stearate.

19. A method as claimed in claim 1 wherein the polymeric emulsifier and optional co-emulsifier are mixed with the fluid under conditions of high shear.

20. A method as claimed in claim 1 wherein the polymeric emulsifier and optional co-emulsifier are mixed with the fluid in a high shear mixing means selected from a venturi nozzle, a choke, an ultrasonic device, an acoustic whistle, a high shear three phase pump, a rotating disc, and a stirrer paddle or a propeller having high shear blades.

21. A method as claimed in claim 3 wherein the polymeric emulsifier and optional co-emulsifier are introduced into a produced fluid at, or upstream of the well head of the oil well or gas well.

22. A method as claimed in claim 1 wherein the weight ratio of polymeric emulsifier and optional co-emulsifier to water in the water-in-oil emulsion is in the range 0.04:1 to 0.2:1.

23. A method as claimed in claim 1 wherein the mole ratio of polymeric emulsifier to co-emulsifier in the water-in-oil emulsion is at least 2:1.

24. A method as claimed in claim 1 wherein the aqueous phase is distributed in the continuous liquid hydrocarbon phase of the water-in-oil emulsion in the form of droplets having a mean diameter of from 0.5 to 2 µm.

25. A method as claimed in claim 24 wherein the droplets of aqueous phase have a polydispersity of up to 20%.

26. A fluid comprising:
   a) a gaseous hydrocarbon phase, and
   b) an emulsion comprising a discontinuous aqueous phase, a continuous liquid hydrocarbon phase and a gas impermeable interfacial layer comprising a polymeric emulsifier and optionally a non-ionic non-polymeric co-emulsifier wherein the aqueous phase is distributed in the continuous liquid hydrocarbon phase in the form of droplets and the gas impermeable interfacial layer encapsulates said droplets.

27. A fluid as claimed in claim 26 wherein the droplets of aqueous phase have a mean diameter of from 0.5 to 2 µm.

* * * * *

UNITED STATES PATENT AND TRADEMARK OFFICE
CERTIFICATE OF CORRECTION

| | | |
|---|---|---|
| PATENT NO. | : 7,008,466 B2 | Page 1 of 1 |
| APPLICATION NO. | : 10/487596 | |
| DATED | : March 7, 2006 | |
| INVENTOR(S) | : Ian R. Collins | |

It is certified that error appears in the above-identified patent and that said Letters Patent is hereby corrected as shown below:

Title page of the patent, left hand column (73) "Assignee", please delete "BP Exploration Operating Company" and insert --BP Exploration Operating Company Limited--.

Signed and Sealed this

Thirteenth Day of February, 2007

JON W. DUDAS
*Director of the United States Patent and Trademark Office*